(12) United States Patent
Ogawa et al.

(10) Patent No.: US 8,476,850 B2
(45) Date of Patent: Jul. 2, 2013

(54) DRIVE CIRCUIT

(75) Inventors: Takashi Ogawa, Ogaki (JP); Tsutomu Murata, Mizuho (JP)

(73) Assignee: ON Semiconductor Trading, Ltd., Hamilton (BE)

( * ) Notice: Subject to any disclaimer, the term of this patent is extended or adjusted under 35 U.S.C. 154(b) by 118 days.

(21) Appl. No.: 13/239,554

(22) Filed: Sep. 22, 2011

(65) Prior Publication Data

US 2012/0074880 A1   Mar. 29, 2012

(30) Foreign Application Priority Data

Sep. 27, 2010   (JP) .................. 2010-215907

(51) Int. Cl.
*H02P 6/06*   (2006.01)
(52) U.S. Cl.
USPC .................................................. 318/400.06
(58) Field of Classification Search
None
See application file for complete search history.

(56) References Cited

FOREIGN PATENT DOCUMENTS

JP          8-037798 A        2/1996
JP          2006-288056 A    10/2006

OTHER PUBLICATIONS esp@cenet Patent Abstract for Japanese Publication No. 2006-288056, publication date Oct. 19, 2006. (1 page).
esp@cenet Patent Abstract for Japanese Publication No. 8037798, publication date Feb. 6, 1996. (1 page).

*Primary Examiner* — Lincoln Donovan
*Assistant Examiner* — Zoheb Imtiaz
(74) *Attorney, Agent, or Firm* — Osha Liang LLP

(57) ABSTRACT

A drive control signal is effectively obtained. An offset is added to a rotational state signal. A drive control signal having a period which is reduced by a predetermined period compared to the sine wave form signal is generated between a crossing of a reference value for a second time and a crossing of the reference value for a next time by an added signal obtained by sequentially offsetting the rotational state signal in a direction reaching the reference value. A pulse indicating that the polarity has been reversed when the offset is added is added to the crossing of the reference value for the first time, to reliably detect crossing of the reference value for the second time.

4 Claims, 12 Drawing Sheets

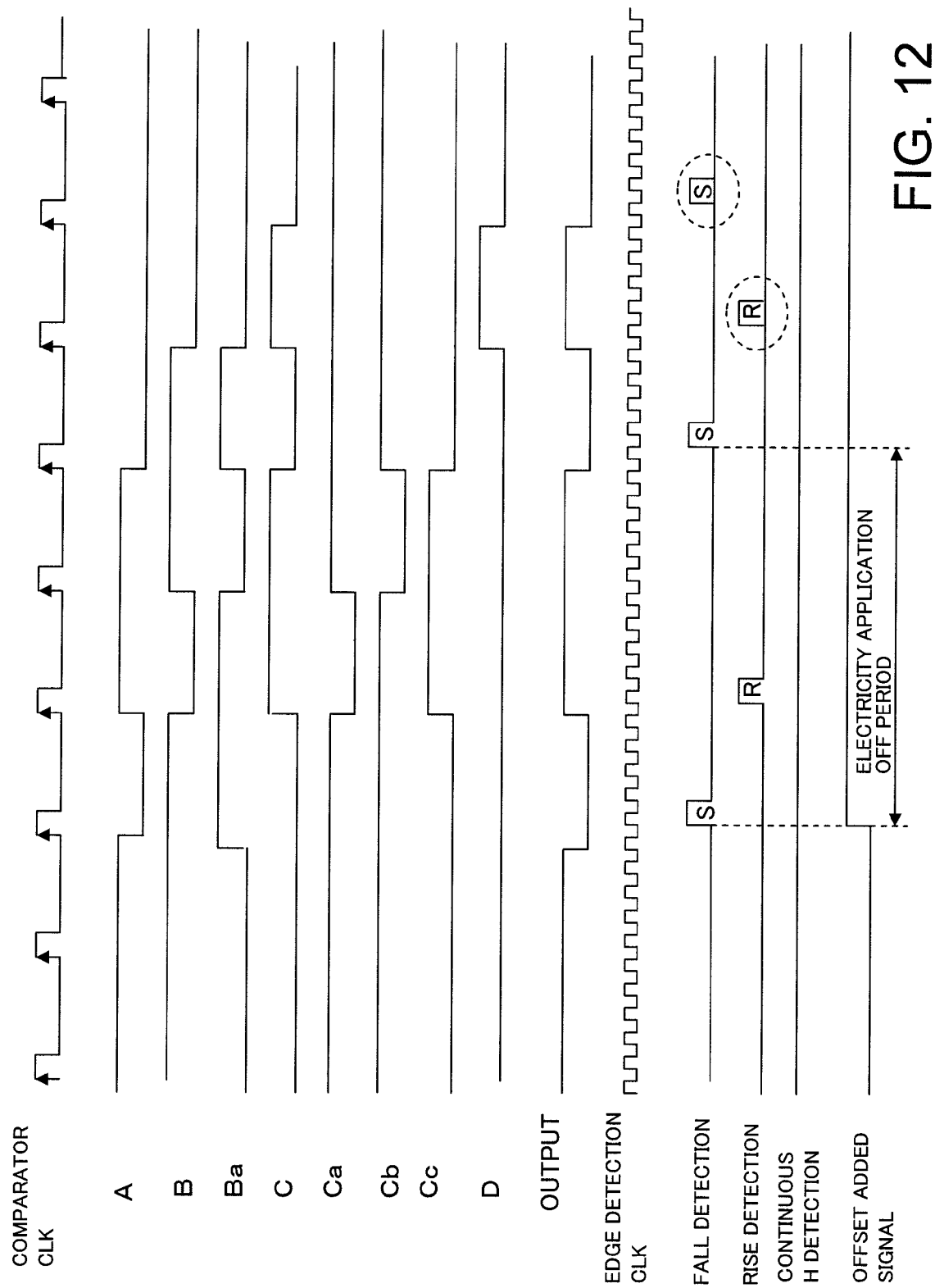

DRIVE CIRCUIT

CROSS-REFERENCE TO RELATED APPLICATIONS

The entire disclosure of Japanese Patent Application No. 2010-215907 filed on Sep. 27, 2010, including specification, claims, drawings, and abstract, is incorporated herein by reference in its entirety.

BACKGROUND

1. Technical Field

The present invention relates to a drive circuit which generates a drive control signal based on a rotational state signal of a sine waveform which indicates a rotational state of a motor.

2. Background Art

Recently, for a vibration function equipped in portable phones or game machines, a position detecting circuit which uses a Hall element is used for detecting a position of a vibration element.

When a magnet is employed as a rotor and a coil is employed as a stator, the Hall element detects a position of the rotor, and a drive circuit supplies a current to the coil based on a detection result of the Hall element.

There exists a demand for minimizing power consumption in an electronic device. This demand is particularly strong for a portable device or the like which is driven by a battery. In a vibration motor which has the vibration element in the related art, currents around 0° and 180° do not significantly contribute to the driving of the motor. In consideration of this, an electricity application method which cuts the currents around 0° and 180° of the motor drive current has been proposed. For example, an electricity application method which cuts electricity application for 30° around 0° and 180° is known as a 150°-electricity application.

In order to execute such 150°-electricity application, a circuit for generating signals for the 150°-electricity application is required. There also is a demand for simplifying this circuit.

SUMMARY

According to one aspect of the present invention, there is provided a drive circuit which generates a drive control signal based on a rotational state signal of a sine wave form which indicates a rotational state of a motor, wherein an added signal is obtained by adding an offset to the rotational state signal by repeating a process in which, upon detection of crossing of a reference value for a first time, from a first direction, by an added signal having a predetermined amount of offset added to the rotational state signal on a side approaching the reference value, the predetermined amount of offset is added to the rotational state signal in a direction returning to the reference value, upon detection of crossing of the reference value for a second time, from the first direction, by the obtained added signal, no offset is added to the rotational state signal, and upon detection of a crossing of the reference value for a first time, from a second direction approaching the reference value from a direction opposite of the first direction, by the added signal, the predetermined amount of offset is added to the rotational state signal on the side approaching the reference value, in response to crossing of the reference value by the added signal based on a comparison of the obtained added signal and the reference value, a rise signal or a fall signal is obtained based on the direction of crossing, and, in response to the detection of the crossing of the reference value for the first time, a fall signal or a rise signal is added at a time that is delayed from the rise signal or the fall signal generated in the detection of the crossing, and a drive control signal having a period which is reduced by a predetermined period compared to the rotational state signal is generated using the obtained rise signal or the obtained fall signal between the detection of the crossing of the reference value for the second time and a detection of the crossing of the reference value for a next time.

According to various aspects of the present invention, a drive control signal in which the electricity application period is reduced can be obtained with a relatively simple circuit, and a drive control signal can be reliably obtained even when the waveform is steep.

BRIEF DESCRIPTION OF THE DRAWINGS

A preferred embodiment of the present invention will be described in further detail based on the following drawings, wherein:

FIG. 12 is a diagram showing waveforms of various signals including a waveform of each section of the reading circuit.

DESCRIPTION OF EMBODIMENT

Figure 1:
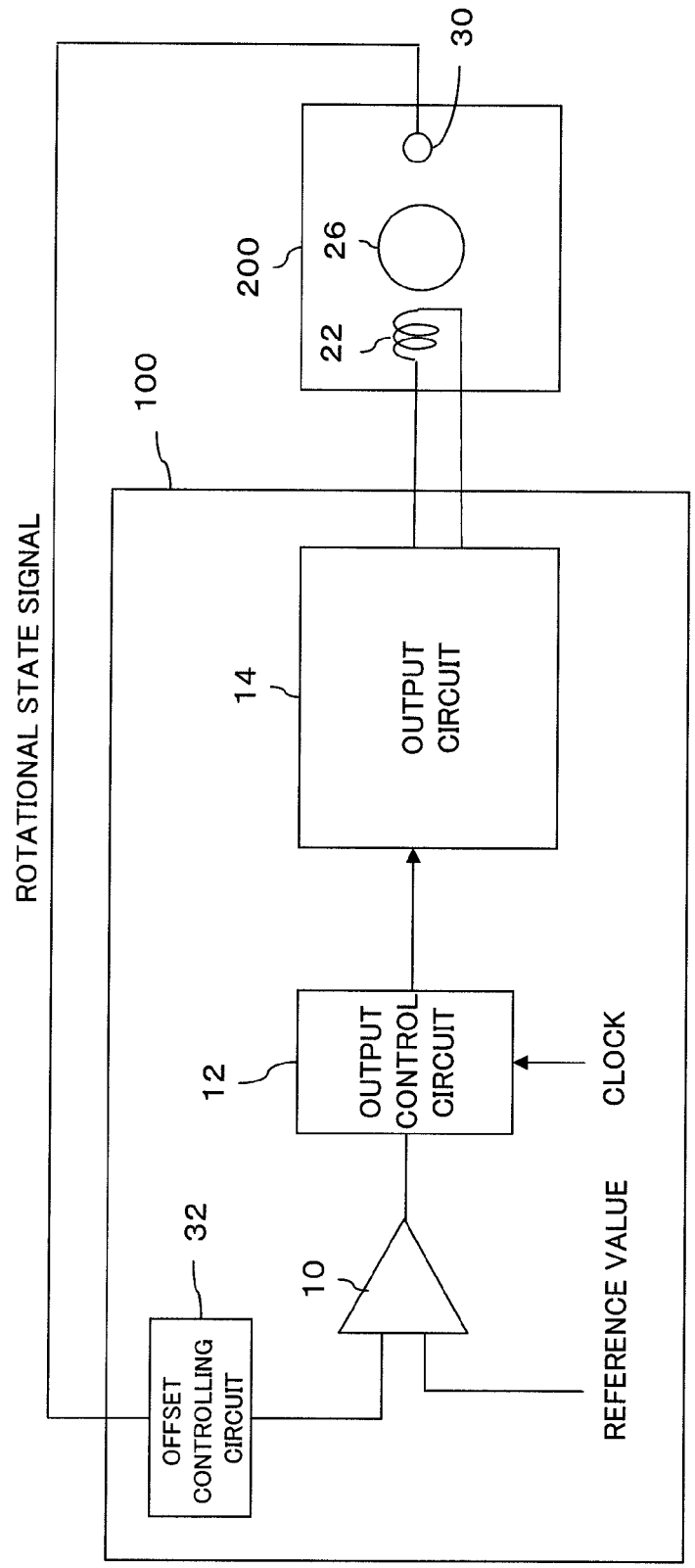
FIG. 1 is a block diagram showing an overall structure.

A preferred embodiment of the present invention will now be described with reference to the drawings. FIG. 1 is a diagram showing an overall structure. A system comprises a driver 100 and a motor 200. An input signal is input to the driver 100, and the driver 100 supplies a drive current corresponding to the input signal to the motor 200. In this manner, rotation of the motor 200 is controlled according to the input signal.

The driver 100 comprises a comparator 10, and a rotational state signal corresponding to a rotor position from a Hall element 30 provided on the motor 200 is supplied through an offset controlling circuit 32 to one terminal of the comparator 10. More specifically, the offset controlling circuit 32 adds a predetermined offset value to the rotational state signal, and an added signal which is alternately shifted in the up-and-down direction is obtained. The added signal is supplied to the one terminal of the comparator 10. A reference value voltage is supplied to the other terminal of the comparator 10, and the comparator 10 detects that the added signal has reached the reference value.

An output of the comparator 10 is supplied to an output control circuit 12. The output control circuit 12 determines a drive waveform (phase) of a predetermined frequency according to the output signal of the comparator 10, and the drive control signals (OUT1, OUT2) are controlled to be PWM-driven, so that the amplitude of the drive current is determined. The generated drive control signal is supplied to an output circuit 14.

The output circuit 14 comprises a plurality of transistors, controls a current from the power supply by switching of the transistors to generate a motor drive current, and supplies the motor drive current to the motor 200.

Figure 2:
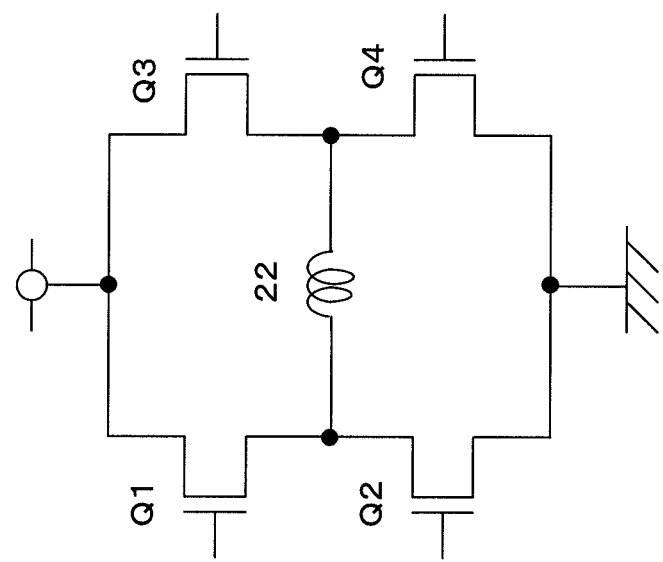
FIG. 2 is a diagram showing an example configuration of an output circuit.

FIG. 2 shows a structure of a part of the output circuit 14 and one coil 22 of the motor 200. As shown in FIG. 2, an arm comprising a series connection of two transistors Q1 and Q2 and an arm comprising a series connection of two transistors Q3 and Q4 are provided between the power supply and the ground, and a coil 22 is connected between an intermediate point of the transistors Q1 and Q2 and an intermediate point of the transistors Q3 and Q4. By switching the transistors Q1 and Q4 ON and the transistors Q2 and Q3 OFF, a current of one direction is supplied to the coil 22, and, by switching the transistors Q1 and Q4 OFF and the transistors Q2 and Q3 ON, a current of an opposite direction is supplied to the coil 22. The coil 22 is driven in this manner.

The motor 200 comprises the coil 22 and a rotor 26. In addition, a permanent magnet is provided on the rotor 26, and, for example, an N pole and an S pole are placed on opposed positions (positions different from each other by 180°). A stable position is determined according to a magnetic field from the coil 22.

Therefore, by supplying an alternating current to the coil, it is possible to move the rotor 26 by the phase of the current and rotate the rotor 26. In addition, by stopping the change of the phase of the current at the time of a certain phase of current, it is possible to stop the rotor at a position corresponding to the current phase at that point in time. In this manner, the rotation of the motor 200 is controlled.

The Hall element 30 is provided on the motor 200, and the rotational state signal is generated according to the magnetic field from the permanent magnet of the rotor 26. When there are one N pole and one S pole as described above, a sine wave having a period of one rotation of the rotor 26 is obtained as the rotational state signal.

The rotational state signal from the Hall element 30 is supplied to the offset controlling circuit 32. The offset controlling circuit 32 shifts the rotational state signal by a predetermined amount of offset, and sets an interval between two reference cross points (in the example configuration, zero-cross points) to, for example, 150°.

Figure 3:
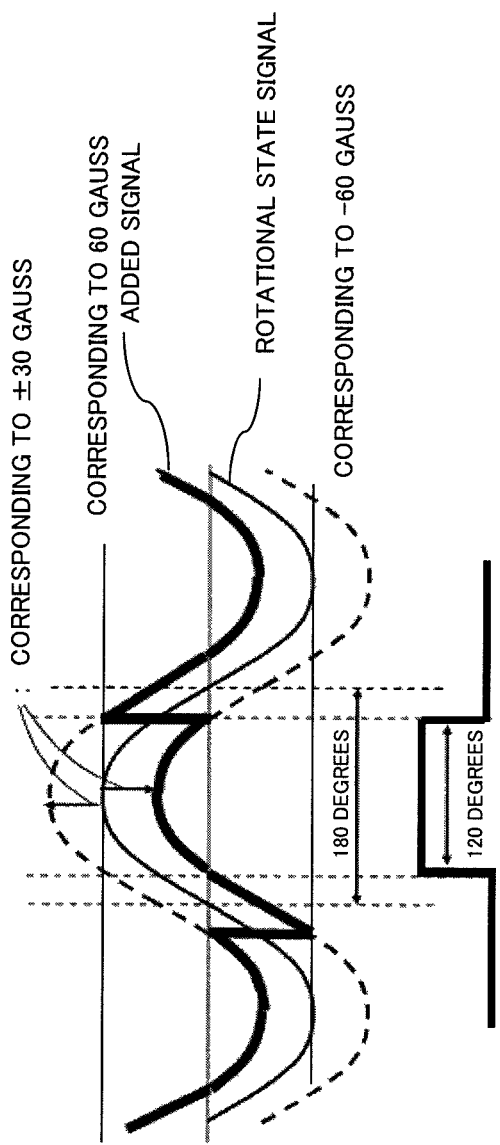
FIG. 3 is a diagram showing an example of an added signal.

FIG. 3 shows an example configuration in which the interval between zero-cross points is changed from 180° to 120°. The rotational state signal is a sine wave of a voltage which corresponds to 0 Gauss at 0°, to +60 Gauss at 90°, to 0 Gauss at 180°, and to −60 Gauss at 270°. Therefore, by setting the rotational state signal closer to zero by a voltage corresponding to 30 Gauss, it is possible to set the interval between two zero-cross points to 120°. Thus, when the added signal to which an amount corresponding to +30 Gauss is added on the negative (−) side (signal in which the rotational state signal is set closer to zero by an amount corresponding to 30 Gauss) reaches zero for the first time (phase of −30° of the rotational state signal), an addition of −30 Gauss (subtraction of 30 Gauss) is employed in place of +30 Gauss. In this manner, the added signal is shifted in the negative (−) direction by an amount corresponding to 60 Gauss. In the case of this example configuration, because the addition of an amount corresponding to −60 Gauss corresponds to a shift corresponding to 60°, the added signal reaches the zero from the negative (−) side for a second time at the phase of the rotational state signal of +30°. In the case of the zero for the second time, the added signal transitions to the positive (+) side with the addition of −30 Gauss unchanged. Then, at the reaching of the zero from the positive (+) side for the first time, the addition is switched to +30 Gauss. In this manner, the amount of offset is switched from +30 Gauss to −30 Gauss at the phase of the rotational state signal of 330°) (−30°, the amount of offset is switched from −30 Gauss to +30 Gauss at the phase of 150°, and these operations are repeated so that a signal of a period of 120° between the zero of the added signal for the second time to the zero for a next time is obtained. In FIG. 3, an example configuration where the interval between the zero-cross points is set to 120° is shown, but by adjusting the amount of offset to be added (in this case, to an amount corresponding to ±15 Gauss), a signal having a period of 150° or the like can be obtained.

Alternatively, a configuration may be employed in which a voltage having the same potential as a common voltage of the Hall element 30 is supplied as the reference to the other terminal of the comparator 10. With such a configuration, the reference values used in the Hall element 30 and the comparator 10 become equal to each other, and the electricity application period to the coil 22 can be set more accurately.

Alternatively, it is also possible to employ a configuration in which two added signals, having two amounts of offset respectively added, are generated, four crossings are detected by comparison of the two added signals and the reference value, and two inner crossings are selected. Alternatively, two added reference values, having two amounts of offset respectively added, may be generated, and the crossing of the rotational state signal may be detected with these added reference values.

Figure 4:
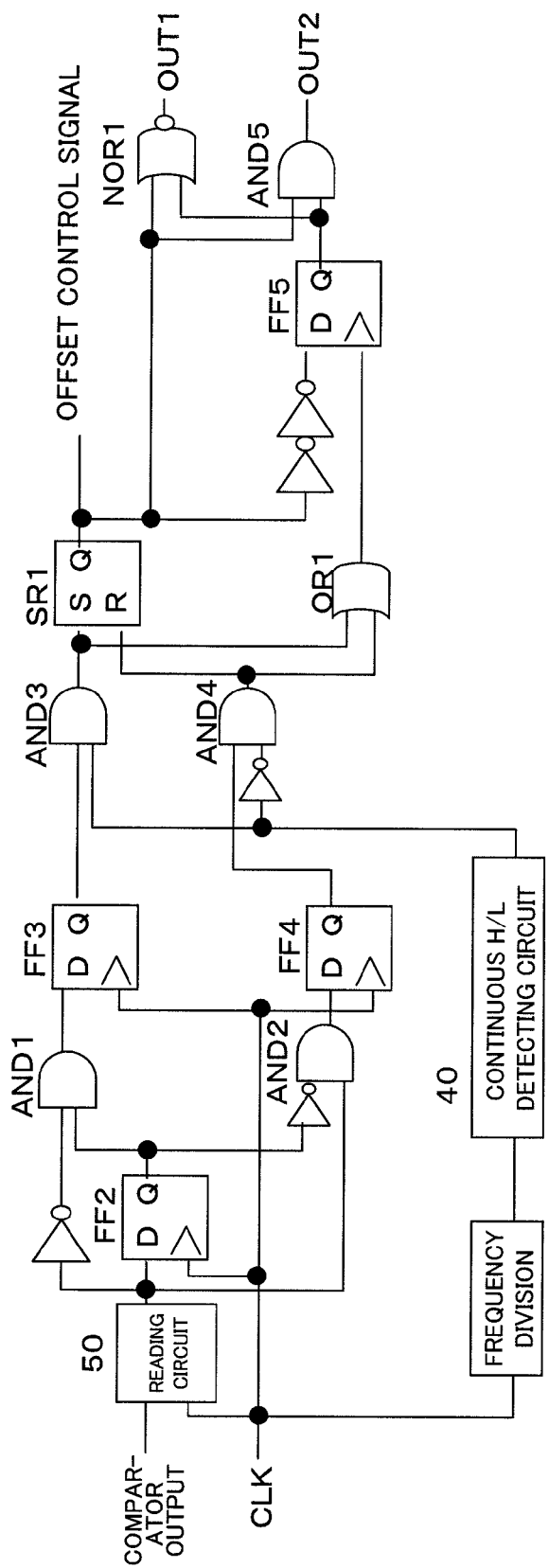
FIG. 4 is a diagram showing an example configuration of an output control circuit.
Figure 5:
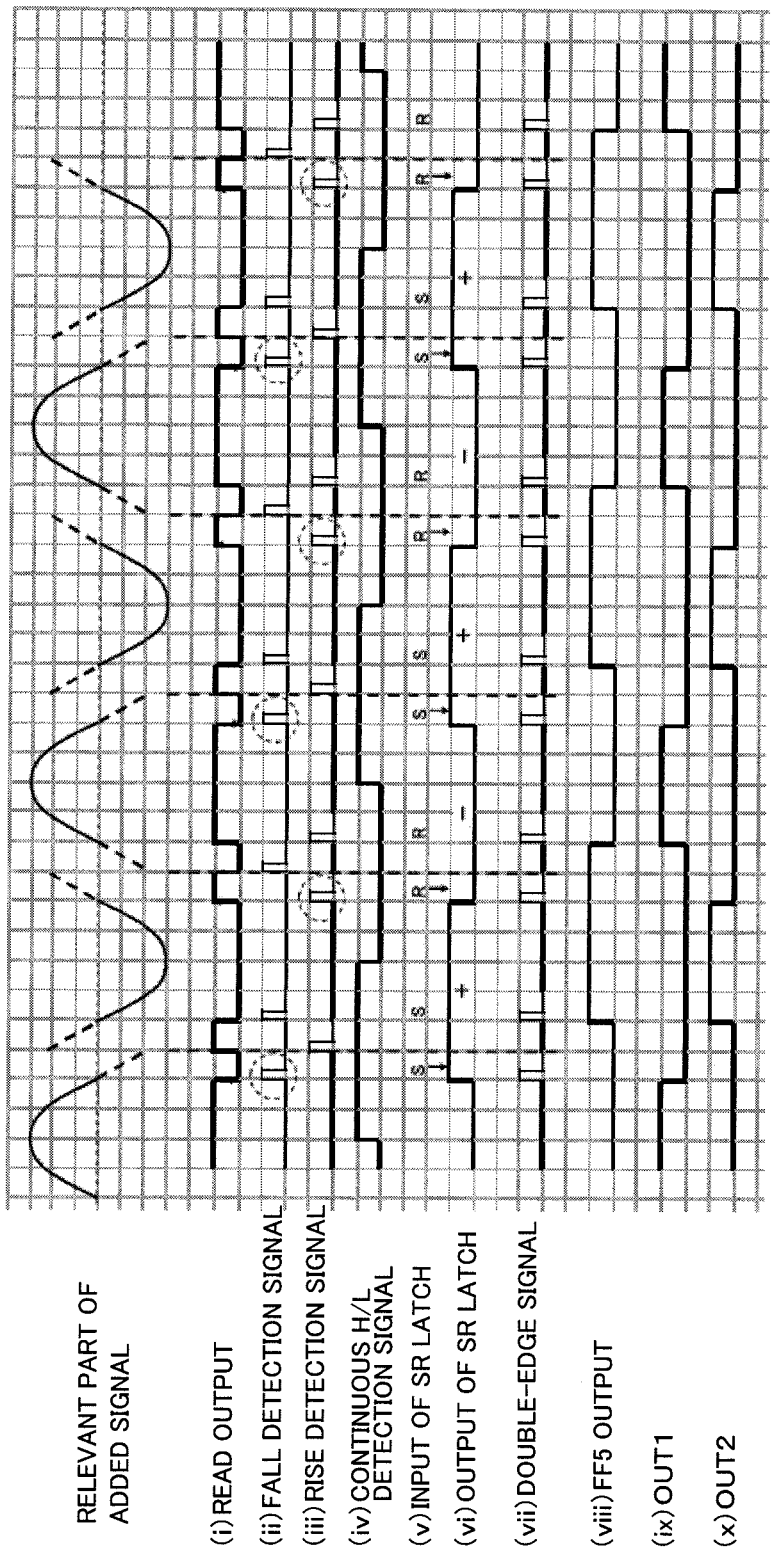
FIG. 5 is a diagram showing a signal waveform of each section of the output control circuit.

FIG. 4 shows an example configuration of the output control circuit 12, and FIG. 5 shows a signal waveform of each section. An output of the comparator (comparator raw output) detects a zero-cross point of a signal obtained by sequentially shifting the rotational state signal in a manner described above. The example configuration shows an example of 120°-electricity application, similar to FIG. 3. The read output when the comparator raw output is read by a flip-flop is L level for the rotational state signal of 0° to 30°, H level for the rotational state signal of 30° to 150°, L level for the rotational state signal of 150° to 180°, H level for the rotational state signal of 180° to 210°, L level for the rotational state signal of 210° to 330°, and H level for the rotational state signal of 330° to 360° (FIG. 5(i)).

The comparator raw output is input to a reading circuit 50. A detailed structure of the reading circuit 50 will be described later. Basically, the reading circuit 50 functions as a D-type flip-flop. Therefore, in this description, the reading circuit 50 is described as a flip-flop. The comparator raw output is supplied to a D input terminal of the reading circuit 50. A predetermined clock CLK is supplied to a clock input terminal of the reading circuit 50, and the reading circuit 50 sequentially holds the output of the comparator 10. Because the clock CLK has a high frequency compared to the change of the output of the comparator 10, the reading circuit 50 reads the output of the comparator 10 without any further processing and with a delay of a predetermined period.

The output of the reading circuit 50 is supplied to a D input terminal of a flip-flop FF2, and the clock CLK is supplied to a clock input terminal of the flip-flop FF2. Therefore, the output of the flip-flop FF2 is a signal which is delayed by one period of the clock CLK compared to the output of the reading circuit 50. The output of the reading circuit 50 is inverted and input to an AND gate AND1, and the output of the flip-flop FF2 is input to the AND gate AND1 without being inverted.

Therefore, the output of the AND gate AND1 is a signal which rises for one period of the clock CLK when the output of the comparator 10 falls.

More specifically, as shown by a fall detection signal of FIG. 5(ii), a signal which rises for one period of the clock CLK at the fall of the read output is obtained at the output of the AND gate AND1.

In addition, the output of the reading circuit 50 and an inverted output of the flip-flop FF2 are input to an AND gate AND2. Therefore, as shown by a rise detection signal of FIG. 5(iii), a signal which rises for one period of the clock CLK at the rise of the read output is obtained at an output of the AND gate AND2.

In FIG. 5, the fall detection signal (ii) and the rise detection signal (iii) are shown as pulses shorter than the clock CLK. This is because a signal having a higher frequency than the clock CLK is used as the clock for fall and rise detection and one clock is set as the detection pulse, but the overall operation is no different.

After a predetermined frequency division is applied to the clock CLK, the clock CLK is input to a continuous H/L detecting unit 40. The continuous H/L detecting unit 40 is set to the H level, for example, when the H level in the read output is continued for a period of 60° and to the L level when the L level in the read output is continued for a period of 60°. Therefore, in the example configuration, the output of the continuous H/L detecting unit 40 is at the H level for a period of the rotational state signal of 90° to 270° and at the L level for the remaining half period (FIG. 5(iv)).

The output of the AND gate AND1 is supplied to a D input terminal of a flip-flop FF3, and the output of the AND gate AND2 is supplied to a D input terminal of a flip-flop FF4. The clock CLK is supplied to clock input terminals of the flip-flops FF3 and FF4. Therefore, the outputs of the AND gates AND1 and AND2 are read to the flip-flops FF3 and FF4. The outputs of the flip-flops FF3 and FF4 are input to AND gates AND3 and AND4, respectively. The continuous H/L detection signal is input to the other input terminal of the AND gate AND3, and an inverted signal of the continuous H/L detection signal is input to the other input terminal of the AND gate AND4. Therefore, in the output of the AND gate AND3, a pulse corresponding to the rotational state signal of 0° in the fall detection signal is removed, and only pulses of 150° and 210° remain. Similarly, in the output of the AND gate AND4, a pulse corresponding to the rotational state signal of 180° in the rise detection signal is removed, and only pulses of 30° and 330° remain.

The output of the AND gate AND3 is supplied to a set input terminal of an SR latch circuit SR1, and the output of the AND gate AND4 is supplied to a reset input terminal of the SR latch circuit SR1 (FIG. 5 (v)). Therefore, as shown in FIG. 5(vi), an offset control signal which becomes the H level at the rotational state signal of 330° and which becomes the L level at the rotational state signal of 150° is obtained at an output of the SR latch SR1. The output of the SR latch SR1 is supplied to the offset controlling circuit 32, and is used for switching control to add a predetermined offset value (corresponding to 30 Gauss) to the rotational state signal when the output is at the H level and to subtract a predetermined offset value (corresponding to 30 Gauss) from the rotational state signal when the output is at the L level.

The outputs of the AND gates AND3 and AND4 are input to an OR gate OR1. A double-edge signal having four pulses at 330°, 30°, 150°, and 210° is obtained at an output of the OR gate OR1 (FIG. 5(vii)). The offset control signal is delayed by a predetermined amount, and then supplied to a D input terminal of a flip-flop FF5. The double-edge signal from the OR gate OR1 is supplied to a clock input terminal of the flip-flop FF5, and a signal which becomes the H level at the rotational state signal of 30° and which becomes the L level at the rotational state signal of 210° is obtained at an output of the flip-flop FF5 (FIG. 5(viii)).

The output of the flip-flop FF5 is input to a NOR gate NOR1 and an AND gate AND5, and the output of the SR latch SR1 is supplied to the other input terminals of the NOR gate NOR1 and the AND gate AND5. Thus, a drive control signal OUT1 which becomes the H level only for a period from 30° to 150° is obtained at an output of the NOR gate NOR1 (FIG. 5(ix)), and a drive control signal OUT2 which becomes the H level only for a period from 210° to 330° is obtained at an output of the AND gate AND5 (FIG. 5(x)).

The drive control signals OUT1 and OUT2 are supplied to the output circuit 14 to control the switching ON/OFF of the transistors Q1 and Q4 and the transistors Q3 and Q2 shown in FIG. 2, so that the drive current control of the coil 22 as described above is executed.

In FIG. 1, because the Hall element 30 is placed at a position opposing the coil 22, a rotational state signal which is synchronized with the coil 22 is obtained, but the position of placement of the Hall element 30 is not necessarily limited. In addition, as described above, the amount of offset to be added to or subtracted from the rotational state signal can be adjusted, to easily realize 150°-electricity application or the like.

The 150°-electricity application has a lower power for rotating the rotor compared to the 180°-electricity application. However, there exists an electricity application stopping period, and there may be cases where the rotation of the rotor is not started and the rotational state signal cannot be obtained. Thus, it is preferable to have the 180°-electricity application at the time of starting the operation. On the other hand, after the rotational state is stabilized, it is preferable to further reduce the power to achieve reduction of power consumption. Therefore, in the present embodiment, PWM conversion is applied to the drive control signal, to achieve reduction of power consumption.

In the rotational drive control of the present embodiment, the zero-cross point of the rotational state signal must be reliably detected. On the other hand, in the reading circuit 50, the comparator raw output is read at the rise of the clock CLK. Therefore, a change in an interval between the rises of the clock CLK cannot be detected with the flip-flop.

Figure 8:
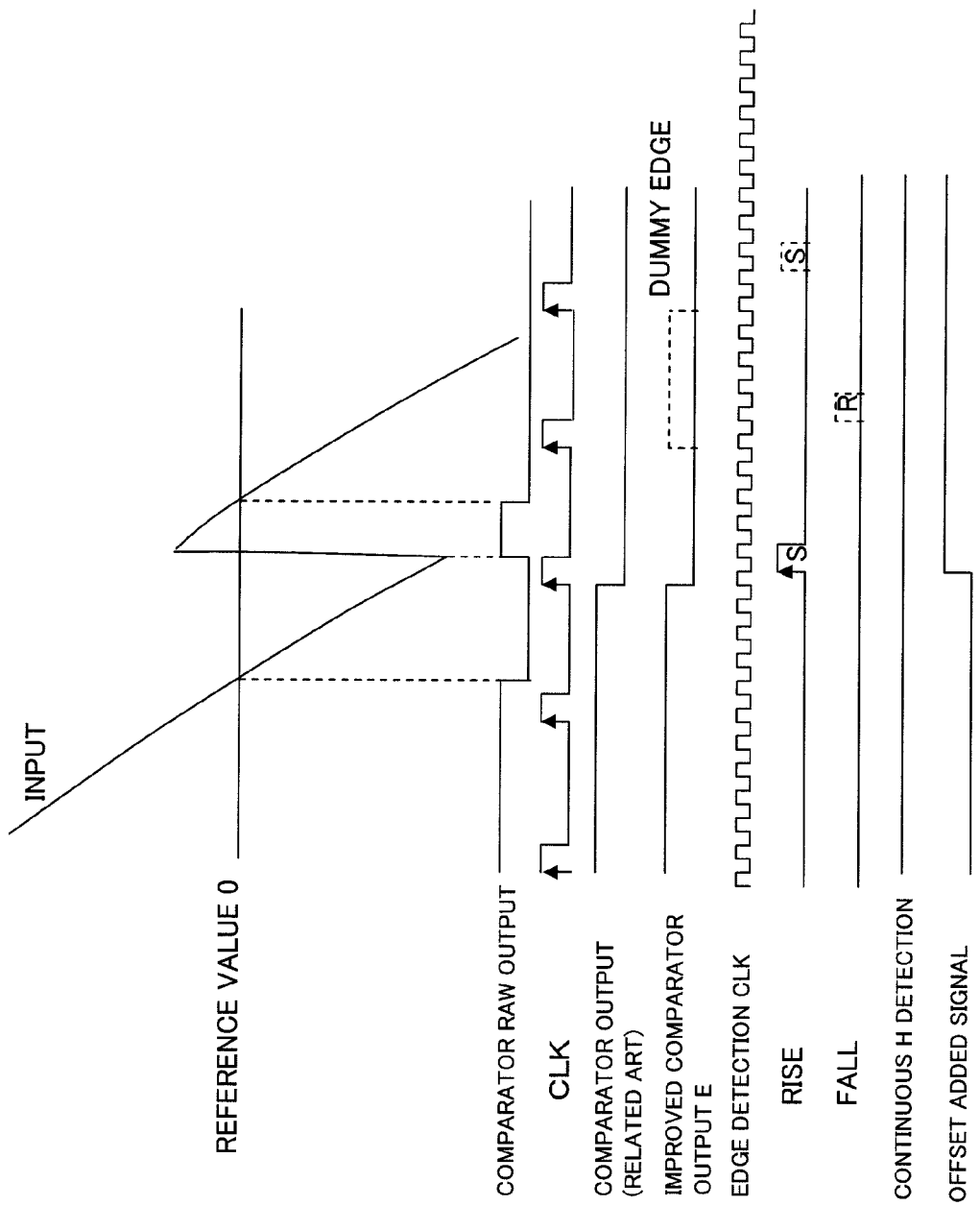
FIG. 8 is a diagram for explaining an example case where a slope of the added signal is large.

For example, in the case of FIG. 8, the raw output of the comparator 10 once becomes the L level, becomes the H level with the addition of the offset, and then becomes the L level again. Therefore, the raw output is a signal having a predetermined L period, a predetermined H period, and a continuous L period.

However, in the case of detecting the raw output of the comparator 10 with the flip-flop as shown in FIG. 8, if the L level of the comparator raw output is detected relatively late, the application of the offset is delayed, and even after the offset is added, the added signal does not significantly exceed the 0-level. Therefore, the H-level period in the comparator raw output is shortened, and if the clock CLK does not rise during the H level, the H level cannot be detected. Thus, accurate output cannot be obtained in the circuit output of FIG. 4.

Figure 6:
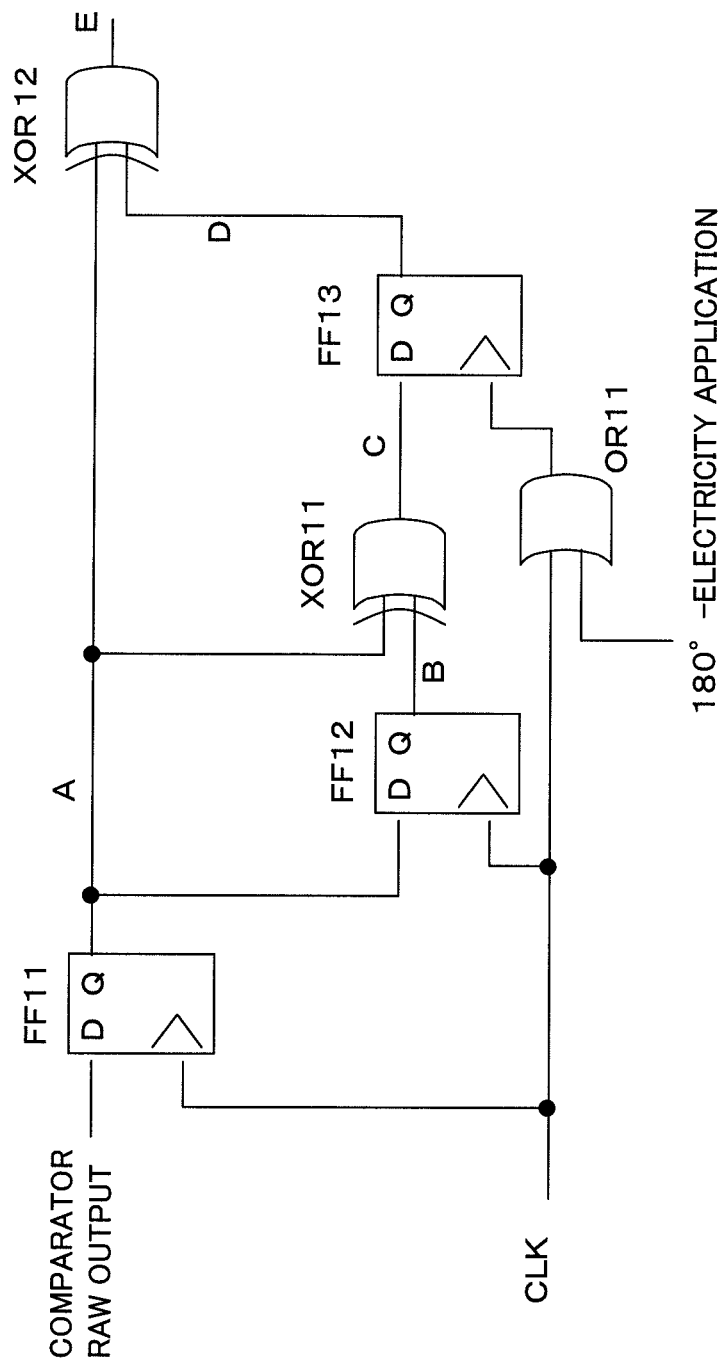
FIG. 6 is a diagram showing a structure of a reading circuit.

In consideration of this, in the present embodiment, a circuit shown in FIG. 6 is employed for the reading circuit 50. Specifically, the comparator raw output is input to a D input terminal of a flip-flop FF11. The clock CLK is input to a clock input terminal of the flip-flop FF11, and the flip-flop FF11 corresponds to the reading circuit 50 made of one flip-flop as described above.

A Q output of the flip-flop FF11 is input to the D input terminal of the flip-flop FF12. Because the clock CLK is input to the clock terminal of the flip-flop FF12, the output of the flip-flop FF1 is latched with a delay of one clock. A Q output of the flip-flop FF12 is input to an exclusive OR circuit XOR11, and the output of the flip-flop FF11 is also input to the exclusive OR circuit XOR11. Therefore, an output of the exclusive OR of the inputs is obtained at an output of the exclusive OR circuit XOR11. Thus, the output of the exclusive OR circuit XOR11 is set to the H level only when the output of the flip-flop FF11 has changed.

The output of the exclusive OR circuit XOR11 is supplied to a D input of a flip-flop FF13. The clock CLK is supplied to a clock terminal of the flip-flop FF13, and the output of the exclusive OR circuit XOR11 is latched with a delay of one clock.

An output of the flip-flop FF13 is input to an exclusive OR circuit XOR12. The output of the flip-flop FF11 is also input to the exclusive OR circuit XOR12, and a result of the exclusive OR operation of these input signals is output from the exclusive OR circuit XOR12. In other words, when the output of the flip-flop FF13 is at the L level, the output of the flip-flop FF11 is output from the exclusive OR circuit XOR12 without being inverted, and when the output of the flip-flop FF13 is at the H level, the output of the flip-flop FF11 is inverted and output from the exclusive OR circuit XOR12.

The clock CLK is input to the clock input terminal of the flip-flop FF13 through an OR gate OR11. A 180°-electricity application signal which becomes the H level when the 180°-electricity application is being executed is supplied to the OR gate OR11. Therefore, during the 180°-electricity application, because the 180°-electricity application signal is at the H level, the flip-flop FF13 is in a reset state, and the output of the OR gate OR11 is fixed at the L level. Thus, in the case of the 180°-electricity application, the output of the flip-flop FF11 is output from the exclusive OR circuit XOR12 without any process, and the circuit of FIG. 6 is equivalent to a circuit of the reading circuit 50 having only one flip-flop FF11.

Figure 7:
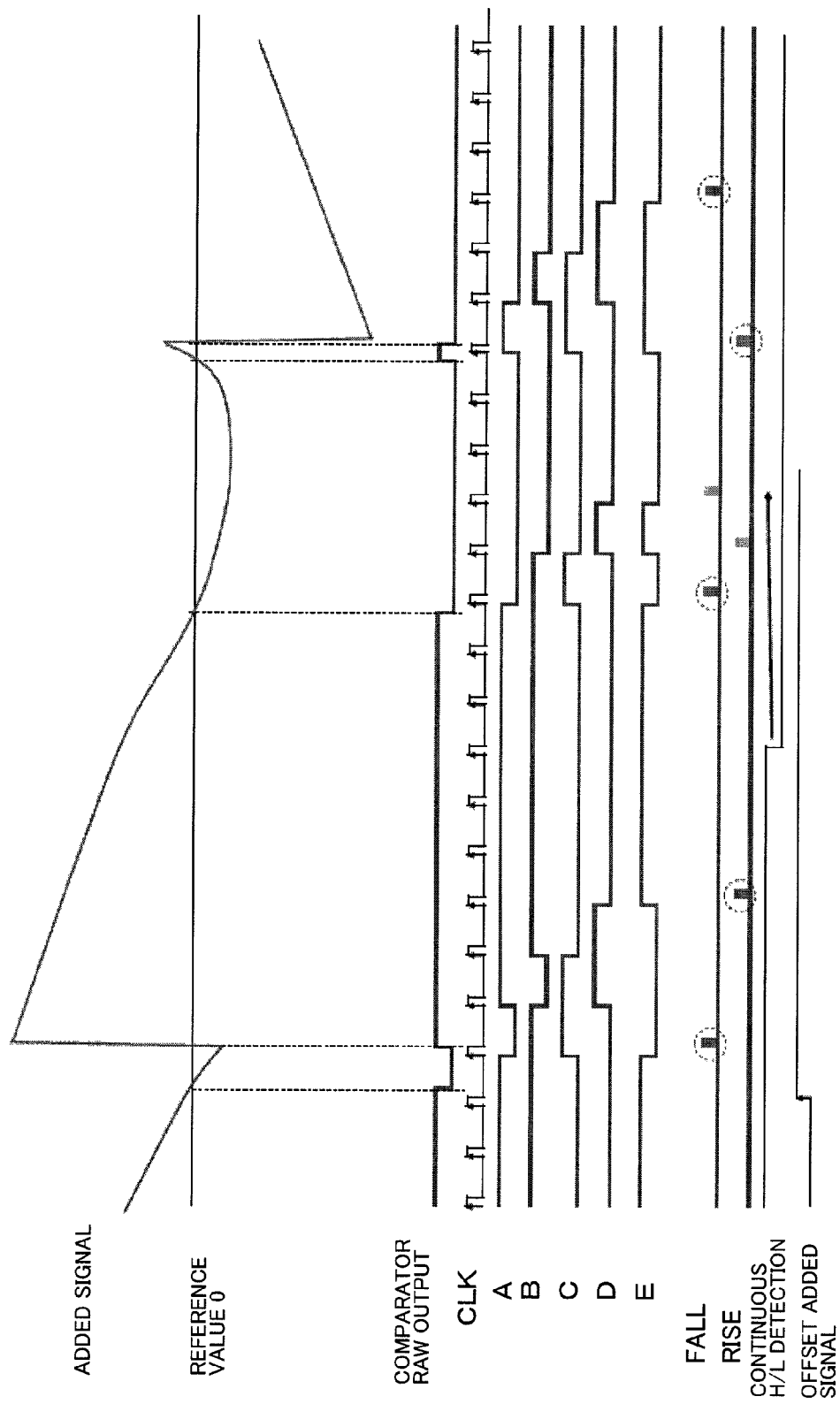
FIG. 7 is a diagram showing waveforms of various signals including a waveform of each section of the reading circuit.

FIG. 7 shows an example waveform of the rotational state signal, and the raw output of the comparator 10 and the waveforms at points A-E of the circuit of FIG. 6 in this example configuration. The waveform A is the output of the flip-flop 11, the waveform B is the output of the flip-flop FF12, the waveform C is the output of the exclusive OR circuit XOR11, the waveform D is the output of the flip-flop FF13, and the waveform E is the output of the exclusive OR circuit XOR12.

In the case of the zero-cross point on the left side of FIG. 7, in the output of the flip-flop FF11, the change is a pulse corresponding to one clock of the clock CLK. In other words, the signal becomes, from the H level, L level for one clock, and then returns to the H level (waveform A). The output of the flip-flop FF12 is a signal delayed by one clock compared to the output of the flip-flop FF11 (waveform B). The output of the exclusive OR circuit XOR11 is an exclusive OR of A and B, and becomes the H level for the period of 2 clocks in which the signals A and B differ from each other (waveform C). The output of the flip-flop FF13 is a signal delayed by one clock from the waveform C. The output of the exclusive OR circuit XOR12 is an exclusive OR of the waveforms A and D, and becomes the L level for a period of 3 clocks from a time when the waveform A becomes the L level until a time when the waveform D becomes the L level. In this manner, the output of the exclusive OR circuit XOR12 is identical to the output of the flip-flop FF11 extended for 3 clocks.

On the other hand, when the change of the flip-flop FF11 continues for 2 or more clocks, a pulse is added to the output of the exclusive OR circuit XOR12.

For example, in the second zero-cross point from the upper part to the lower part in FIG. 7, the output of the flip-flop FF11 is maintained at the L level for a while after the output changes from the H level to the L level. The waveform B which is the output of the flip-flop 12 is only delayed by one clock from the waveform A, and the output of the exclusive OR circuit XOR11 becomes the H level only for one clock when the waveforms A and B differ from each other (waveform C). The waveform D is delayed by one clock from waveform C, and because of the exclusive OR of the waveforms A and D, the output of the exclusive OR circuit XOR12 changes from the H level to the L level corresponding to the change of the waveform A to the L level, after one clock becomes the H level for one clock at the H level of the waveform D, and then returns to the L level (waveform E).

Therefore, when the slope of the rotational state signal is steep and the change in the opposite direction after the offset is small, as in the example configuration of FIG. 8, the change of the comparator raw output in the opposite direction cannot be detected, and the output of the flip-flop FF11 becomes fixed after changing once. According to the circuit of FIG. 6, a pulse indicating that the signal has reached the opposite polarity once can be added in such a case. Therefore, even when the slope of the rotational state signal is steep, the second zero-cross point can be reliably detected.

On the other hand, as can be seen from FIG. 7, when the period after the change is sufficiently long, in the waveform E which is the output of the exclusive OR circuit XOR12, an additional pulse which is redundant is added compared to the output of the flip-flop FF11.

However, in the range where the continuous H/L detection signal does not change, the flip-flop SR1 in FIG. 4 merely reads the signal of the same level one additional time, the output does not change, and no problem is caused. The H/L detection signal changes at the mountain or valley portion (90°, 270°) of the rotational state signal, and does not change near the zero-cross point. Therefore, even when a rise or fall detection signal is added, no problem is caused.

In other words, the continuous H/L detecting circuit 40 changes the state when the output of the exclusive OR circuit XOR12 continues for a period of 60°. Therefore, the timing when the pulse is added is after the output of the exclusive OR circuit XOR12 is stabilized, that is, after the outputs of the rise and fall signals are completed. Thus, even if the rotational state or the like changes, the timing of the change of the continuous H/L detection signal does not occur near the zero-cross point.

The above-described control is preferably executed after the rotation is stabilized. With such a configuration, the influence of chattering can be prevented, and the electricity application period can be set to an approximate desired period (for example, a period of 150° of electrical phase).

As described above, by adding a dummy edge as shown in FIG. 6, the offset can be reliably added. However, with the circuit of FIG. 6, the electricity application OFF period is not sequentially widened to a period of 2 CLKs, a period of 3 CLKs, and a period of 4 CLKs according to the change of the raw comparator output, but rather, is changed to a period of 2 CLKs and then a period of 4 CLKs.

Figure 9:
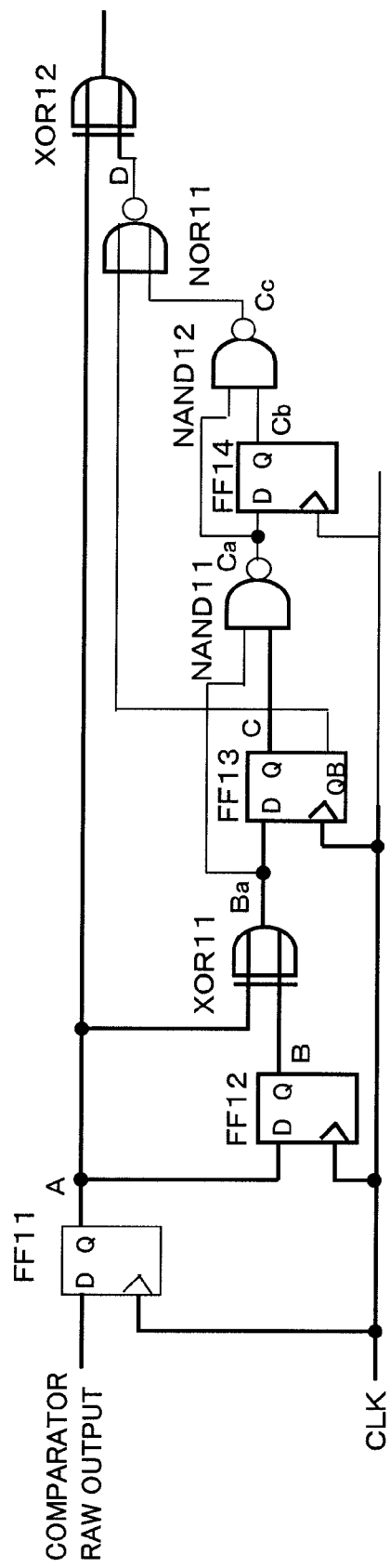
FIG. 9 is a diagram showing a structure of a reading circuit.

FIG. 9 shows a structure in which the reading circuit 50 shown in FIG. 6 is further improved so that the electricity application OFF period is sequentially widened to a period of 2 CLKs, a period of 3 CLKs, and a period of 4 CLKs according to the change of the raw comparator output. FIGS. 10-13 show operations of the case of the circuit structure of FIG. 9.

As shown in FIG. 9, the process is identical to that of FIG. 6 in that the comparator raw output is read by a flip-flop FF11, an output signal A of the flip-flop FF1 is read by a flip-flop FF12 to obtain a signal B which is delayed by one clock, and the output signal B of the flip-flop 12 and the signal A are input to the exclusive OR circuit XOR11. With this structure, a signal Ba which becomes the H level when the comparator raw output changes is obtained at an output of the exclusive OR circuit XOR11. The output signal Ba of the exclusive OR circuit XOR11 is supplied to a D input of a flip-flop FF13. The clock CLK is supplied to a clock terminal of the flip-flop FF13, and the signal Ba is read with the rise of CLK. Therefore, a signal C in which the signal Ba is delayed by one clock is obtained at an output of the flip-flop FF13. The output signal C of the flip-flop FF13 is supplied to a NAND gate NAND11. The signal Ba is also supplied to the NAND gate NAND11, and a signal Ca which becomes the L level when both signals C and Ba are at the H level is obtained at an output of the NAND gate NAND11.

The output signal Ca of the NAND gate NAND11 is supplied to a D input of a flip-flop FF14. The clock CLK is supplied to a clock terminal of the flip-flop FF14, and the signal Ca is read at the rise of the clock CLK. Therefore, a signal Cb in which the signal Ca is delayed by one clock is obtained at an output of the flip-flop FF14. The output signal Cb of the flip-flop FF14 is supplied to a NAND gate NAND12. The signal Ca is also supplied to the NAND gate NAND12, and a signal Cc which becomes the H level when both signals Ca and Cb are at the L level is obtained at an output of the NAND gate NAND12.

The output signal Cc of the NAND gate NAND12 is supplied to a NOR gate NOR11. A signal from an inverted output QB of the flip-flop FF13 (inverted signal of signal C) is also supplied to the NOR gate NOR11, and a signal D which becomes the H level when the signal Cc is at the L level and the signal C is at the H level is obtained at an output of the NOR gate NOR11.

The signals D and A are supplied to an exclusive OR circuit XOR12, and an output signal which becomes the H level when the signals D and A differ from each other (improved comparator output) is obtained.

Figure 10:
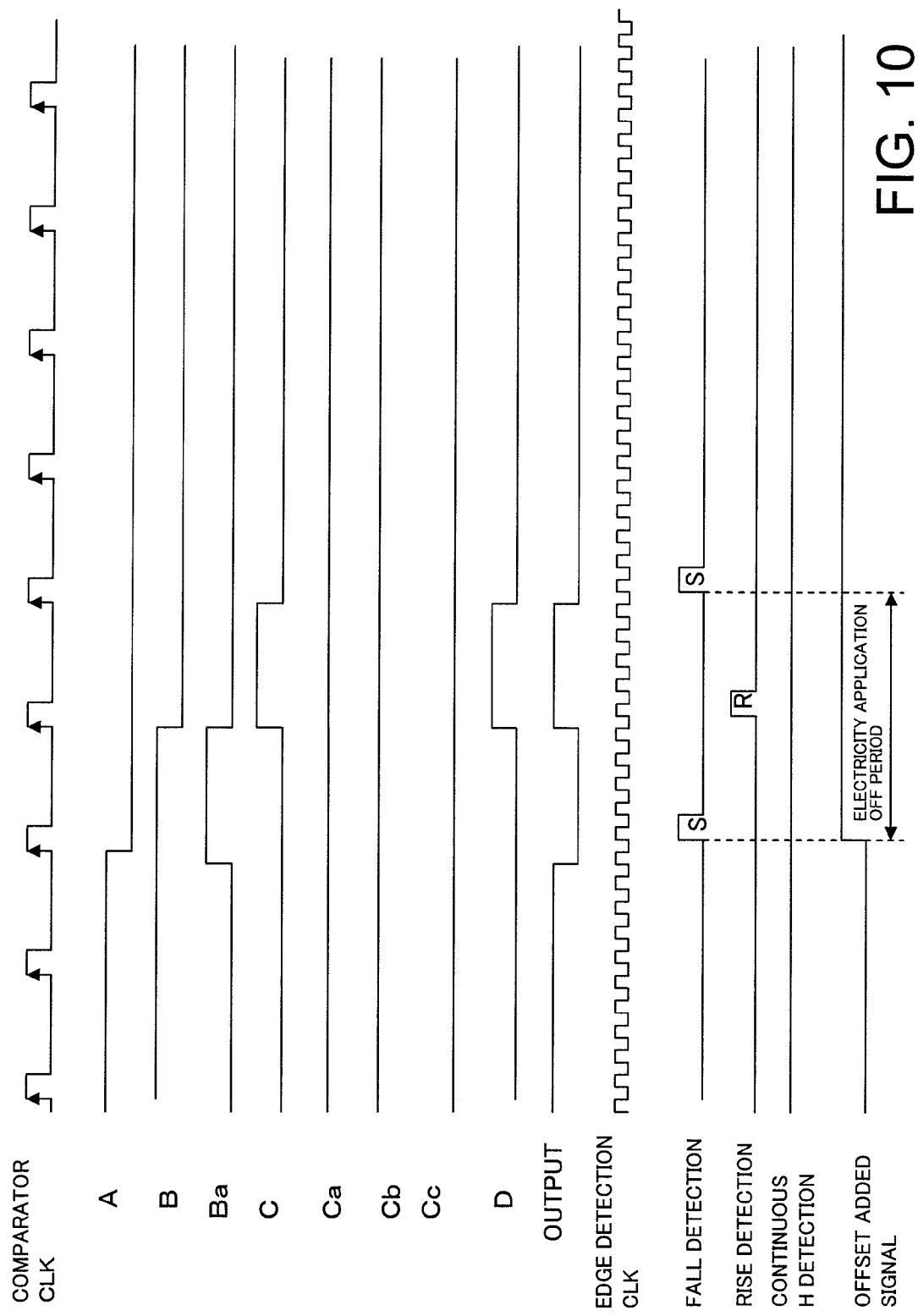
FIG. 10 is a diagram showing waveforms of various signals including a waveform of each section of the reading circuit.

FIG. 10 shows an operation when the edge of the second time cannot be obtained after the fall in such a circuit. As shown in FIG. 10, a period of H level is added to the signal D which is the dummy edge generating signal, and an electricity application OFF period of two clocks is provided.

Figure 11:
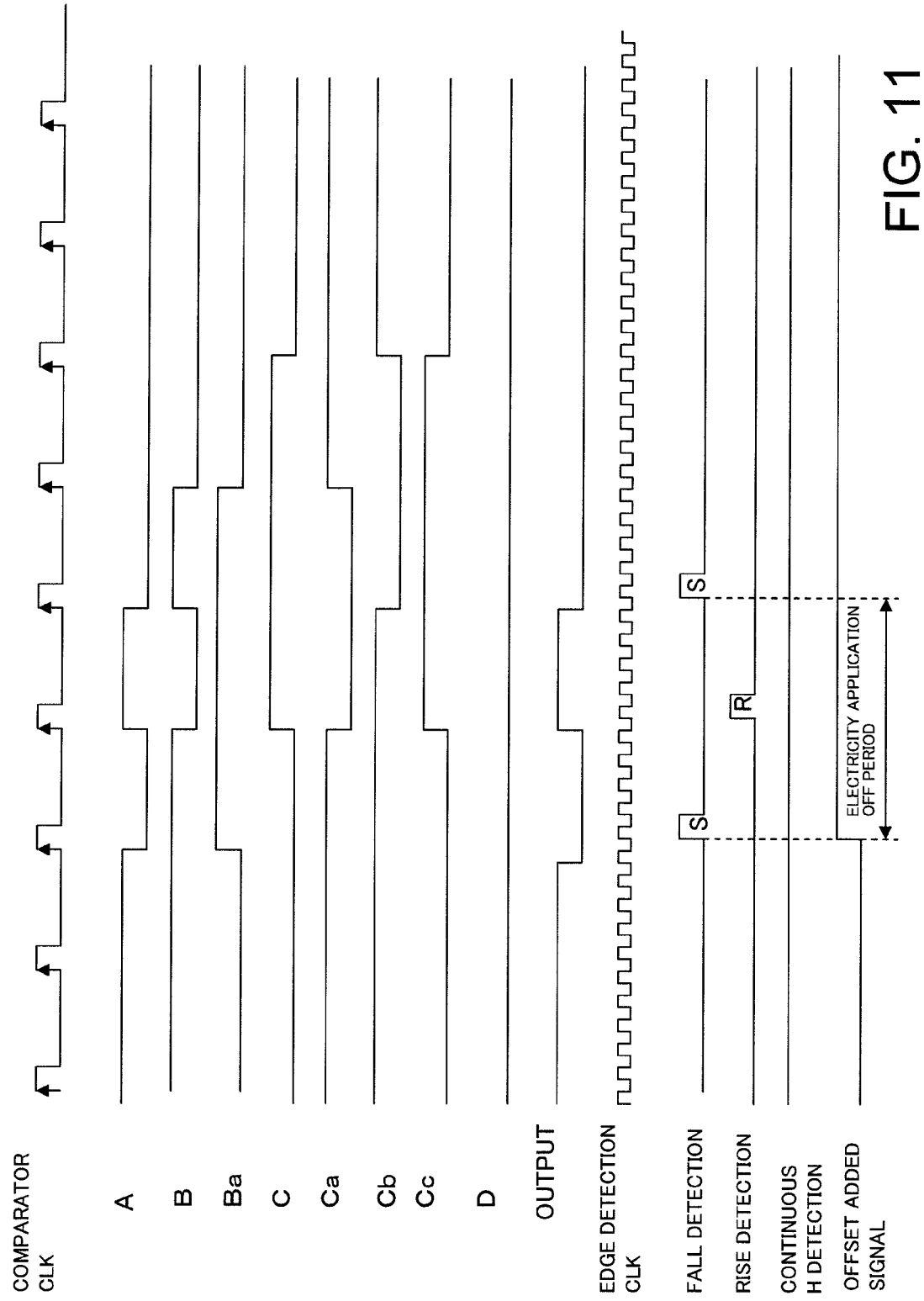
FIG. 11 is a diagram showing waveforms of various signals including a waveform of each section of the reading circuit.

FIG. 11 shows an operation when the edge of the second time can be obtained for 1 clock after the fall. As shown in FIG. 11, a period of H level is added to the signal D which is the dummy edge generating signal, and an electricity application OFF period of two clocks is provided.

FIG. 12 shows an operation when the edge of the second time can be obtained for 2 clocks after the fall. As shown in FIG. 12, a period of H level is added to the signal D which is the dummy edge generating signal, and an electricity application OFF period of three clocks is provided. In addition, due to the dummy edge, a fall detection signal and a rise detection signal are redundantly added, but no problem is caused, similar to the above.

According to the structure of the present embodiment, an electricity application OFF period of four clocks is provided when the edge of the second time can be obtained for 3 clocks after the fall, and an electricity application OFF period of five clocks is provided when the edge of the second time can be obtained for 4 clocks after the fall.

What is claimed is:

1. A drive circuit which generates a drive control signal based on a rotational state signal of a sine wave form which indicates a rotational state of a motor, wherein an added signal is obtained by adding an offset to the rotational state signal by repeating a process in which,
upon detection of crossing of a reference value for a first time, from a first direction, by an added signal having a predetermined amount of offset added to the rotational state signal in a direction approaching the reference value, the predetermined amount of offset is added to the rotational state signal in a direction away from the reference value,
upon detection of crossing of the reference value for a second time, from the first direction, by the obtained added signal, no offset is added to the rotational state signal, and
upon detection of crossing of the reference value for a first time, from a second direction approaching the reference value from a direction opposite of the first direction, by the added signal, the predetermined amount of offset is added to the rotational state signal in a direction approaching the reference value,
in response to crossing of the reference value by the added signal based on a comparison of the obtained added signal and the reference value, a rise signal or a fall signal is obtained based on a direction of the crossing, and in response to the detection of the crossing of the reference value for the first time, a fall signal or a rise signal is added at a time delayed from the rise signal or the fall signal generated in the detection of the crossing, and
a drive control signal having a period which is reduced by a predetermined period compared to the rotational state signal is generated using the obtained rise signal or the obtained fall signal between the detection of the crossing of the reference value for the second time and a detection of the crossing of the reference value for a next time.

2. The drive circuit according to claim 1, wherein
the detection of the crossing of the added signal and the reference value is executed by generating a rise signal or a fall signal based on a change of a read signal obtained by reading, at a predetermined clock, a raw output of a comparator which compares the added signal and the reference value.

3. The drive circuit according to claim 1, wherein
addition of the rise signal or the fall signal is prohibited by a control signal from outside.

4. The drive circuit according to claim 2, wherein
addition of the rise signal or the fall signal is prohibited by a control signal from outside.

* * * * *